United States Patent [19]
Fischer et al.

[11] Patent Number: 6,078,402
[45] Date of Patent: Jun. 20, 2000

[54] ACCESSORY BASED RESOURCE OFFSET MECHANISM FOR A PCI BUS IN A PRINTER

[75] Inventors: Todd A. Fischer; Harold C. Ockerse, both of Boise; Scott D. Bonar, Meridian, all of Id.; Steven J. Jahr, Granite Bay, Calif.

[73] Assignee: Hewlett-Packard Company, Palo Alto, Calif.

[21] Appl. No.: 08/936,845

[22] Filed: Sep. 24, 1997

[51] Int. Cl.[7] ........................................ B41J 15/00
[52] U.S. Cl. .................. 358/1.16; 358/1.17; 358/1.1; 358/1.15; 710/8; 710/9; 710/12
[58] Field of Search ........................ 395/114, 112, 395/115, 116, 101, 821, 275; 710/8, 9, 12; 358/1.15, 1.13, 1.16, 1.18

[56] References Cited

U.S. PATENT DOCUMENTS

| | | | |
|---|---|---|---|
| 5,197,128 | 3/1993 | Campbell et al. | 395/275 |
| 5,765,181 | 6/1998 | Oberlin et al. | 711/5 |
| 5,864,738 | 1/1999 | Kessler et al. | 395/200.69 |

FOREIGN PATENT DOCUMENTS

| | | | |
|---|---|---|---|
| 0790560A2 | 1/1997 | European Pat. Off. | G06F 13/00 |

OTHER PUBLICATIONS

Great Britain Search Report.

*Primary Examiner*—Edward L. Coles
*Assistant Examiner*—Coulter Henry, Jr.
*Attorney, Agent, or Firm*—Lane R. Simmons

[57] ABSTRACT

A peripheral device (such as a printer) locates shareable resources on an accessory by using an offset mechanism on the accessory. The offset mechanism includes one or more offset values stored in a first memory location on the accessory. The one or more offset values are indicative of offsets of one or more resources within the accessory memory. The one or more accessory resources are shareable with the peripheral device. A further offset value is stored in a second memory location on the accessory. The further offset value is indicative of an offset for determining the first memory location on the accessory. Additionally, a base address is stored in yet another memory location on the accessory and provides a general reference point for locating the first memory and accessory resources as mapped into the peripheral's memory. In a preferred embodiment, the offset mechanism of the present invention is implemented as an enhanced feature of the PCI Local Bus Specification. For example, the first memory location is disposed in the PCI defined Memory Address Space of the accessory, and the second memory location and base address are both disposed in the PCI defined Configuration Address Space of the accessory. Advantageously, the present invention enables a peripheral device to locate resources on an accessory without knowing in advance where the resources are located on the accessory.

21 Claims, 3 Drawing Sheets

ACCESSORY BASED RESOURCE OFFSET MECHANISM FOR A PCI BUS IN A PRINTER

FIELD OF THE INVENTION

This invention relates in general to computer peripherals, such as printers, and, more particularly, to local bus interface mechanisms for allowing peripherals to communicate with accessory components.

BACKGROUND OF THE INVENTION

The Peripheral Component Interface (PCI) is fast becoming a preferred interface for input/output functions in computer-related apparatus. The PCI Local Bus Specification is an industry standard which provides details regarding signal levels, protocols and circuit configurations for interconnecting external devices to existing internal bus structures in data processing equipment. See PCI Local Bus Specification, Revision 2.1 (Jun. 1, 1995) incorporated in full herein by reference.

The PCI interface is generally implemented to interconnect an application on a host computer to an external device or communication apparatus. Typically, an input/output (I/O) card interconnects with the host as an "accessory" to the host, and the PCI specification provides a mechanism for interconnecting the I/O card and host. The I/O card carries memory that is used to communicate with the host and is at least in part accessible to the processor(s) of the host (i.e., a common memory space on the card is shared between the host and card).

A common mechanism for allowing the host and accessory to exchange information uses shared memory that can be read and written by both processors (one processor on the host and one on the accessory) and, additionally, uses interrupt registers that: (i) allow both processors to post an interrupt to each other, (ii) determine if the other processor has posted an interrupt, and (iii) clear a posted interrupt. When this mechanism is used with the PCI local bus, the shared memory and interrupt registers (used by the host) are part of the accessory resources which are made available to the host.

To facilitate the interconnect between the host and accessory, PCI provides a mechanism for allowing the host to determine what type of accessory is installed by using the specially designated Register Class Code and/or Device ID fields in the PCI Configuration Space. These features are fully described in the PCI specification. However, this PCI mechanism of identifying installed accessories is not very flexible because the host application must be designed in a manner such that it has complete prior knowledge of the location of resources (i.e., memory registers) that the accessory makes available to the host. For example, the "IDE" controller class is used by devices that comply with the PCI IDE controller specification which completely describes the register level programming interface that must be followed. Simply stated, the host must have a prior knowledge of the register assignment before it can use the accessory, and the host must know the address arrangement of the accessory resources in the common memory space.

The PCI local bus specification also defines a mechanism for mapping a block of accessory based resources into the host microprocessor's memory space. However, the location of each resource within the block is fixed by the accessory designer.

FIG. 1 is a block diagram of an exemplary PCI Configuration Address Space 10 and PCI Memory Address Space 15 for an accessory. PCI Configuration Address Space 10 includes Configuration Space Registers 20, of which only Base Address Register 0 is shown (identified with reference number 25). Base Address Register 0 holds a value that points to the area of common memory in the PCI Memory Address Space 15 where the Accessory Based Resources 30 reside. In the example shown, four memory registers (resources) are depicted within Accessory Based Resources 30 and denoted as Card Register Block 35, Interrupt Status Register 40, Interrupt Clear Register 45, and Interrupt Set Register 50. Note, however, that there is no indication of where the four resources actually are located in the Accessory Based Resources 30 memory space. This is because, as conventional in the art, the resources are FIXED based upon the type and design of accessory installed. Namely, the physical address locations of these resources are fixed based on arbitrary design criteria for the accessory. Accordingly, this resource address information must be known in advance by the host in order to access the registers and utilize the accessory correctly.

Where the host is a general purpose computer as has been conventional in the art, such advance knowledge of accessory resources has typically not been a problem. This is because the developer (or manufacturer) of the accessory generally develops a device driver that executes on the host to interface with the accessory. The developer hard codes the accessory resource information into the device driver. In the event the accessory is modified, the developer simply updates its device driver and distributes it to the user for reloading on the host. Similarly, if the developer desires the device driver to be compatible with other accessories, then the known fixed resources are determined for those other accessories and hard coded into the device driver and then distributed for update to the user. Thus, updating a device driver on a general purpose host computer for a specific accessory or accessories has not been uncommon.

Lately, however, the PCI local bus interface has been used not only to interconnect host computers with their accessories, but also peripheral devices with their accessories. For example, some printer devices use PCI to interface the printer with its accessories (such as disk drives or network cards within the printer). In this context, the peripheral (i.e., printer) is the host for the accessory and, again, the prior art requires that the peripheral know the predefined resource configuration of the accessory in order to properly use the accessory. However, disadvantageously, this presents more of a problem in the peripheral-accessory context than in the general purpose host computer-accessory context because the peripheral is not a general purpose computer. Rather, the peripheral has a predefined and limited capability.

Typically, peripherals are not designed to accommodate the loading of updated device drivers that know an accessory's configuration. Rather, the accessory's configuration must be hard coded into the peripheral's own operating system so that the peripheral will know the address arrangement of each accessory based resource before operation. For example, the peripheral must use its own internal driver in order to be able to: (i) identify each accessory's revision, and (ii) use that accessory. This requires multiple firmware segments to work with the potentially various accessory versions. As a result, peripheral code development can be long and complicated, and additional testing of code upgrades may also be required. All in all, in the event of a need to modify (upgrade) the accessory or expand the peripheral's compatibility with additional accessories, major steps must be taken to upgrade the peripheral's own operating system device drivers. This usually requires a peripheral firmware upgrade or the replacement of Read Only Memory (ROM) chips—both of which can be costly, time consuming and burdensome.

Accordingly, an object of the present invention is to enable an improved PCI local bus for a peripheral and its accessories.

SUMMARY OF THE INVENTION

According to principles of the present invention in a preferred embodiment, a peripheral device (such as a printer) locates shareable resources on an accessory by using an offset mechanism on the accessory. The offset mechanism includes one or more offset values stored in a first memory location on the accessory. The one or more offset values are indicative of offsets of one or more resources within the accessory memory. The one or more accessory resources are shareable with the peripheral device.

A further offset value is stored in a second memory location on the accessory. The further offset value is indicative of an offset for determining the first memory location on the accessory. Additionally, a base address is stored in yet another memory location on the accessory and provides a general reference point for locating the first memory and accessory resources as mapped into the peripheral's memory.

In a preferred embodiment, the offset mechanism of the present invention is implemented as an enhanced feature of the PCI Local Bus Specification. For example, the first memory location is disposed in the PCI defined Memory Address Space of the accessory, and the second memory location and base address are both disposed in the PCI defined Configuration Address Space of the accessory. Advantageously, the present invention enables a peripheral device to locate resources on an accessory without knowing in advance where the resources are located on the accessory.

Other objects, advantages, and capabilities of the present invention will become more apparent as the description proceeds.

DETAILED DESCRIPTION OF THE INVENTION

Figure 1:
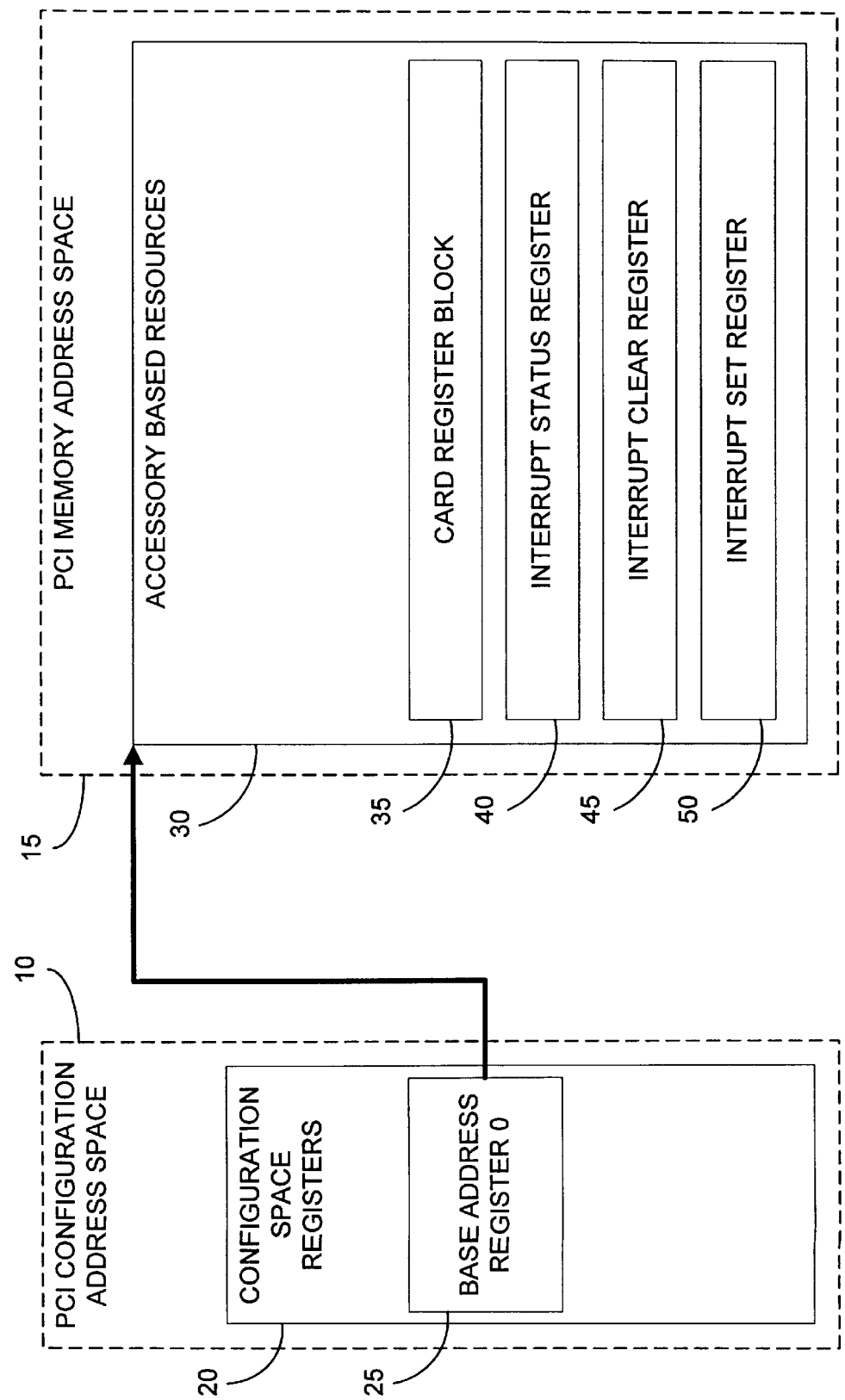
FIG. 1 is a block diagram of the prior art PCI Configuration Space Header and Memory Address Space and depicts the fixed locations of accessory based resources.

FIG. 1 is a block diagram of the prior art PCI Configuration Space Header 10 and Memory Address Space 15 and is shown to clearly distinguish the prior art from the present invention. As discussed in the Background, the prior art PCI bus utilizes fixed locations for accessory based resources 35, 40, 45 and 50 which severely restrict the broader use of PCI in peripheral devices such as printers.

Figure 2:
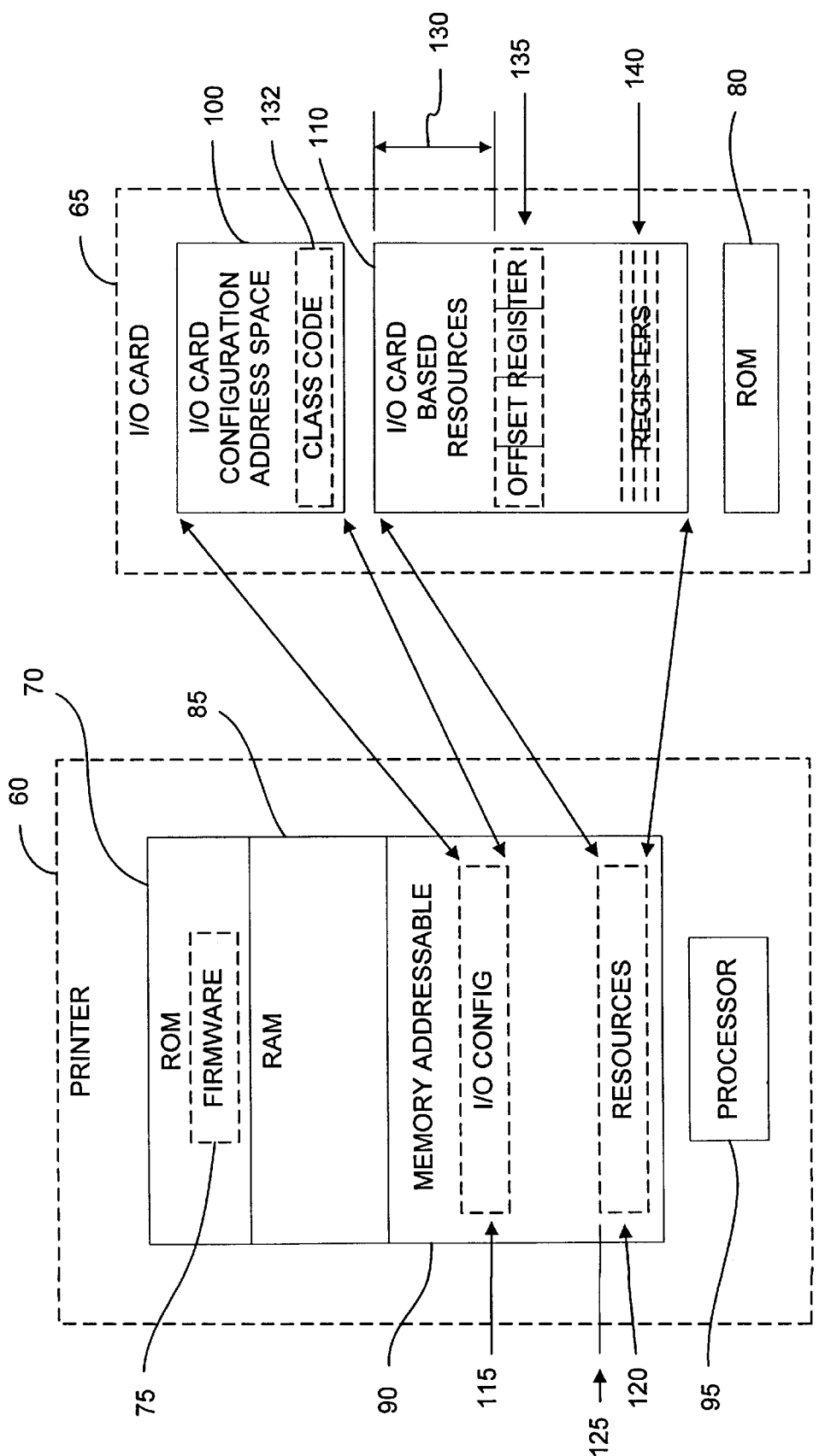
FIG. 2 is a block diagram of a laser printer having an I/O card accessory and employing the present invention offset mechanism.

FIG. 2 is a block diagram of a laser printer 60 having I/O card (accessory) 65 and employing the present invention offset mechanism. However, printer 60 is merely exemplary of a peripheral device employing the present invention. As such, it will be obvious to those of ordinary skill in the art that host computers in general, or, other peripheral devices, such as ink jet printers, facsimile machine, copiers and the like, are similarly usable in connection with the present invention. Printer 60 includes processor 95, Read Only Memory (ROM) 70, and Random Access Memory (RAM) 85 as conventional in the art. Firmware 75 stored within ROM 70 facilitates the method of the present invention offset mechanism. Memory Addressable space 90 is a virtual region that extends beyond physical RAM 85 but is addressable by processor 95. It should be noted here that the order shown of ROM 70, RAM 85 and Memory Addressable space 90 is merely exemplary, and that other configurations are equally applicable.

I/O card 65 is representative of an accessory card for use in connection with printer 60. Typically, such a card is slidably insertable into a connection slot within printer 60 for interfacing therewith. I/O card 65 includes Configuration Address Space 100 and Card Based Resources 110 as defined by the conventional PCI specification. Typically, these are embodied in a conventional Application Specific Integrated Circuit (ASIC) on I/O card 65. The present invention supplements these PCI features, without breaking protocol, to provide the benefits of the invention disclosed herein.

Generally speaking, the present invention employs firmware 75 in ROM 70 to map Configuration Address Space 100 of I/O card 65 to appear at area 115 of Memory Addressable area 90. Similarly, Card Based Resources 110 are mapped to appear at area 120 of Memory Addressable area 90, starting at base address 125. This mapping enables processor 95 to virtually address Configuration Address Space 100 and Card Based Resources 110 when processor 95 addresses areas 115 and 120 respectively of Memory Addressable area 90. Once these areas are mapped, processor 95 is then able to read, write and manage information to and from certain shared resources in Configuration Address Space 100 and Card Based Resources 110.

More specifically, processor 95 executes firmware 75 to store base address 125 into Base Address Register 0 (not shown in FIG. 2, but see FIGS. 1 and 3) in Configuration Address Space 100, thus mapping Card Based Resources 110 into reference area 120. Additionally, an offset value (or index) 130 is fetched which identifies the offset location (relative to base address 125) of Offset Register 135. In a preferred embodiment, offset value 130 is fetched from the Class Code field 132 of Configuration Address Space 100. Although other fields may be used to hold the offset, Class Code field 132 works well because of its PCI defined 24 bit size and because of the fact that only the first 16 bits are actually used to define the Class Code. Thus, the last 8 bits are usable under the present invention for loading of the offset value 130 without interfering with conventional PCI protocol.

Offset Register 135 holds further offset values (relative to base address 125) for other resources (registers) 140 within the ASIC of I/O card 65. These offset values enable the present invention to provide flexible utilization of accessory based resources. As such, printer 60 is able to utilize the resources of I/O card 65 without knowing in advance the exact address arrangement of those resources. Using this mechanism, printer 60 is able to locate the offset values of the needed accessory based resources that are visible to the printer. Thus, newer versions of an accessory (I/O card 65) can be released into the field after the introduction of a peripheral (printer 60) without the need for a peripheral firmware upgrade.

Figure 3:
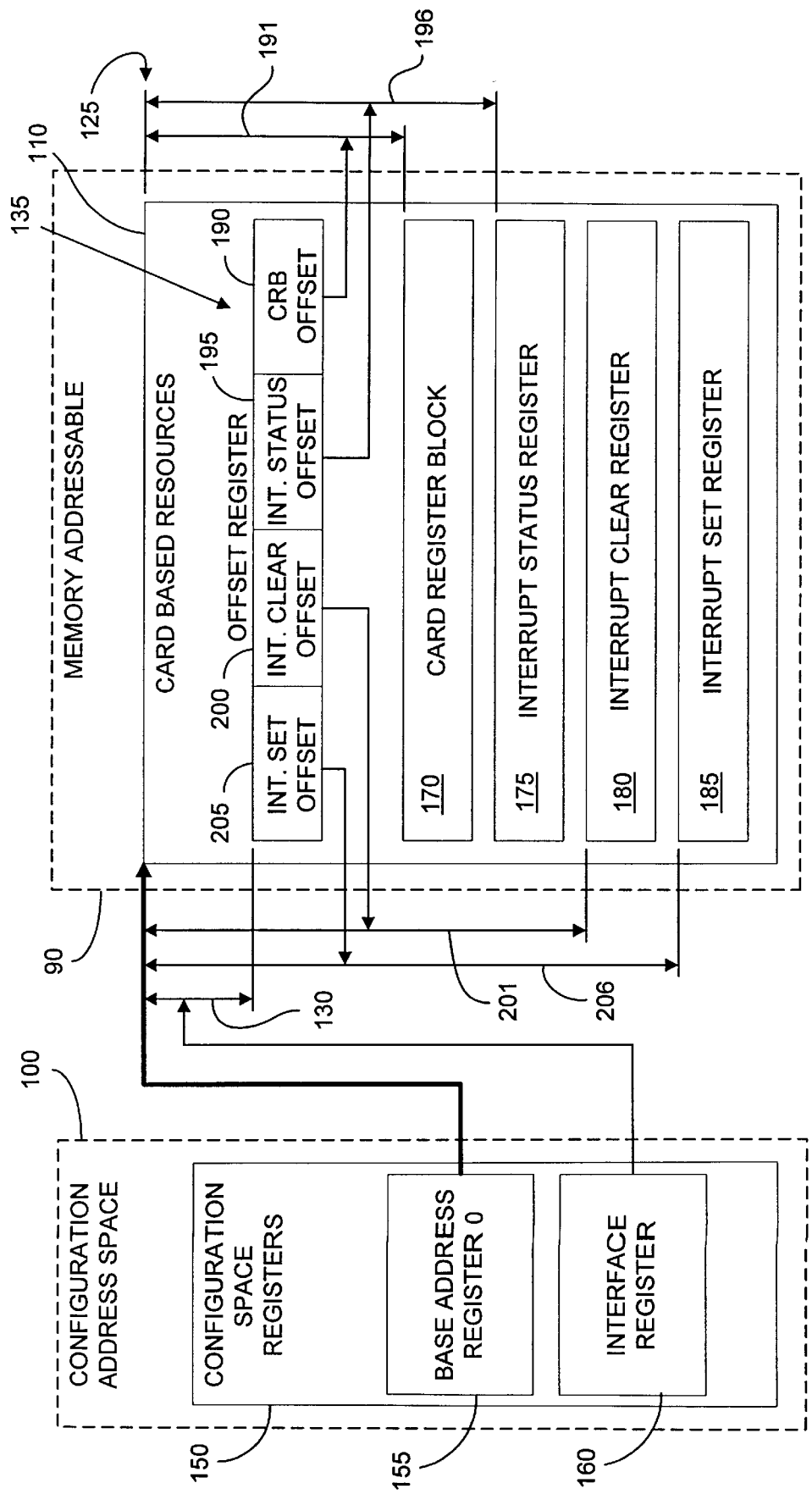
FIG. 3 is a block diagram of the present invention offset mechanism for identifying relative locations of accessory based resources using a PCI Configuration Space Header.

Referring now to FIG. 3, a block diagram represents the present invention offset mechanism for identifying relative locations of accessory based resources (Card Based Resources) 110 using Configuration Space Header 100 (modeled after the PCI Local Bus Specification). Card Based Resources 110 are shown as mapped into Memory Addressable area 90 of printer 60. Configuration Address Space 100 includes Configuration Space Registers 150 such as Base Address Register 0 (reference numbered 155) and Interface Register 160. Base Address Register 0 (155) is a conventional PCI register and holds base address 125. Interface Register 160 is another conventional PCI register. In a preferred embodiment, Interface Register 160 is actually part of the PCI Class Code Register (132 of FIG. 2). Interface Register 160 holds the offset value 130 that is indicative of the offset location of Offset Register 135 relative to base address 125. Thus, the location of Offset Register 135 can be determined by adding offset value 130 to base address 125. Although offset register 135 is shown as a separate and unique register, under the present invention it may in fact be any designated shareable register within Card Based Resources 110. Offset value 130 is loaded from ROM 80 (FIG. 2) associated with I/O card 65 into Interface Register 160 upon initialization of I/O card 65.

Offset Register 135 is logically divided into areas 190, 195, 200 and 205 which contain the offset values 191, 196, 201 and 206, respectively, for the locations of further accessory based resources to be shared with printer 60. The offset values 191, 196, 201 and 206 are loaded from ROM 80 into their respective locations 190, 195, 200 and 205 of Offset Register 135 upon initialization of the card. These values may be loaded from ROM 80 by a processor (not shown) on I/O card 65, or by basic hardware (i.e., ASIC) initialization routines for the card.

In the example of FIG. 3, the shareable resources (registers) are arbitrarily labeled Card Register Block (CRB) 170, Interrupt Status Register 175, Interrupt Clear Register 180, and Interrupt Set Register 185. The resources' actual locations are determined by adding to base address 125, respectively, the offset values defined in CRB Offset 190, Interrupt Status Offset 195, Interrupt Clear Offset 200, and Interrupt Set Offset 205. The relationships between the various offset values and the locations of the accessory based resources are demonstrated by the directional arrows in the diagram. It should be noted that the accessory based resources can occur in any order so long as the values in Offset Register 135 appropriately reflect the offset order.

Advantageously, with the offset mechanism of the present invention, an accessory card (I/O card 65) developer can establish an accessory with appropriate offset information to its resources so that any device, and especially any peripheral device such as printer 60, can access that information to establish a common PCI Local Bus Specification interface without knowing in advance the arrangement of the accessory based resources. Thus, newer versions of the accessory can be released into the field after the introduction of the peripheral without the need for a peripheral firmware upgrade. Additionally, hardware designers can use the best available PCI ASIC without concern for address compatibility with the old accessory version; new hardware needn't be modified to force it into a rigid address arrangement; and hardware/firmware interaction is reduced, resulting in faster accessory development. Moreover, customers can buy a newer accessory for a peripheral without any need to upgrade the firmware in the peripheral, thus resulting in less peripheral down time and better customer satisfaction. And finally, since peripheral firmware upgrades are no longer needed to support newer accessories, firmware development cycles are shorter, test cycles are faster, and fewer defects reach the customer.

What has been described above are the preferred embodiments of an accessory based resource offset mechanism. It will be obvious to one of ordinary skill in the art that the present invention is easily implemented utilizing any of a variety of software, firmware and/or hardware components existing in the art. Moreover, while the present invention has been described by reference to specific embodiments, it will be apparent that other alternative embodiments and methods of implementation or modification may be employed without departing from the true spirit and scope of the invention.

What is claimed is:

1. A computing device, comprising:
   (a) a processor;
   (b) an accessory device removably coupled to the computing device, the accessory having memory thereon and resources defined in the memory that are shareable with the computing device; and,
   (c) executable instructions stored in a memory of the computing device for execution by the processor, and wherein in response to execution of the instructions the processor communicates with the accessory via the accessory resources without prior knowledge of the address arrangement of the accessory resources in the accessory memory, the communication occurring by referencing at least two offset values in the accessory memory for identifying each resource.

2. The computing device of claim 1 wherein the computing device is an imaging device.

3. The computing device of claim 1 wherein the accessory device is an Input/Output device.

4. The computing device of claim 1 wherein the one or more shareable resources are memory locations that are readable, writeable, or read/writeable by the processor.

5. The computing device of claim 1 wherein the accessory memory includes:
   (a) a base address stored in a first register in the accessory memory, the base address being indicative of a base reference location for identifying the accessory resources;
   (b) a first of the offset values stored in a second register in the accessory memory, the first offset value being indicative of an offset relative to the base address for a third register in the accessory memory; and,
   (c) one or more second of the offset values stored in the third register, the one or more second offset values being indicative of offsets relative to the base address for one or more of the accessory resources.

6. The computing device of claim 5 wherein the first and second registers are included in a configuration address space of the accessory that is compatible with a PCI Local Bus Specification.

7. The computing device of claim 5 wherein the second offset value is stored within a class code field of a configuration address space of the accessory that is compatible with a PCI Local Bus Specification.

8. The computing device of claim 5 wherein the accessory includes means for loading the first offset value into the second register and the one or more second offset values into the third register upon an initialization of the accessory in the computing device.

9. An accessory, comprising:
   (a) a connection for removably coupling the accessory to a computing device;
   (b) a memory;
   (c) a base address stored in a first register in the memory, the base address being indicative of a base reference location for identifying resources in the memory;

(d) a first offset value stored in a second register in the memory, the first offset value being indicative of an offset relative to the base address for a third register within the accessory memory; and, (e) one or more second offset values stored in the third register, the one or more second offset values being indicative of offsets relative to the base address for one or more of the resources, and wherein the one or more resources are shareable with the computing device; and, wherein upon connection with the computing device the resources are made available to the computing device without the computing device having prior knowledge of the address arrangement of the resources in the accessory memory, the resources made available by means of the computing device referencing the base address, the first offset value, and the one or more second offset values.

10. The accessory of claim 9 wherein the computing device is an imaging device.

11. The accessory of claim 9 wherein the accessory is an Input/Output device.

12. The accessory of claim 9 further including means for loading the first offset value into the second register and the one or more second offset values into the third register upon an initialization of the accessory in the computing device.

13. A method of establishing communication between a computing device and an accessory, comprising:

(a) removably coupling the accessory to the computing device, the accessory having memory thereon and resources defined in the memory that are shareable with the computing device; and, (b) executing instructions stored in a memory of the computing device to reference at least two offset values stored in the accessory memory for identifying a location of each of the shareable resources, wherein the computing device communicates with the accessory via the shareable resources without prior knowledge of the address arrangement of the shareable resources in the accessory memory.

14. The method of claim 13 wherein the offset values are referenced relative to a base address referenced in the accessory memory.

15. The method of claim 14 wherein one of the offset values is stored in a first memory location of the accessory and defines an offset to a second memory location of the accessory that stores at least one other of the offset values, and wherein the at least one other of the offset values defines an offset to at least one of the shareable resources in the accessory memory.

16. The method of claim 15 wherein a summing of the at least one other of the offset values and the base address identifies a location of a respective one of the shareable resources.

17. The method of claim 15 wherein the base address and first memory location are disposed within a configuration address space of the accessory that is compatible with a PCI Local Bus Specification.

18. The method of claim 13 wherein the computing device is an imaging device.

19. The method of claim 13 wherein the accessory is an input/output device.

20. A computer-readable medium having computer-executable instructions configured to reference at least two offset values stored in a memory of an accessory for identifying a location of a shareable resource in the memory without prior knowledge of an address of the shareable resource in the memory, the instructions further configured to enable a computing device to communicate with the accessory via the shareable resource.

21. A method of communicating between a computing device and an accessory, comprising, executing instructions to reference at least two offset values stored in a memory of the accessory for identifying a location of a shareable resource in the accessory memory without prior knowledge of the address of the shareable resource in the accessory memory, wherein the computing device is enabled to communicate with the accessory via the shareable resource.

* * * * *